United States Patent Office 3,313,835
Patented Apr. 11, 1967

3,313,835
METALLOCENYL SUBSTITUTED ORGANOSILICON MATERIALS AND A METHOD FOR MAKING THEM
Edward V. Wilkus, Albany, and Abe Berger, Schenectady, N.Y., assignors to General Electric Company, a corporation of New York
No Drawing. Filed May 27, 1963, Ser. No. 283,531
5 Claims. (Cl. 260—439)

The present invention relates to certain organosiliconmetallocene materials. More particularly, the present invention relates to bis-(silylmetallocene) organic materials and to a method for making them.

The bis-(silylmetallocene) organic materials of the present invention are included by the formula, (1) $[(R')_3Si—R—Y—Z—Y'—]_2A$ where R is a divalent radical having at least two carbon atoms selected from hydrocarbon radicals and halogenated hydrocarbon radicals, A is a member selected from R and methylene, R' is a member selected from monovalent hydrocarbon radicals, halogenated monovalent hydrocarbon radicals, cyanoalkyl radicals, fluoroalkyl radicals, and halogen radicals, Y and Y' are members selected from carbonyl, carbinol, carbamino, carbazido and methylene, Z is a divalent metallocene radical having the formula, (2) $—[Q_4C_5]M[C_5Q_4]—$ M is a transition metal, Q is chemically bonded to a five-membered carbocyclic and a member selected from hydrogen, a monovalent electron donating organic radical, and a monovalent electron withdrawing organic radical.

Radicals included by R of Formula 1 are divalent aryl radicals, and halogenated divalent aryl radicals such as arylene radicals and halogenated arylene radicals for example, phenylene, chlorophenylene, tolylene, etc.; divalent aliphatic radicals, halogenated divalent aliphatic radicals; divalent cycloaliphatic radicals such as alkylene radicals, cycloalkylene radicals, for example, ethylene, trimethylene, tetramethylene, cyclohexyldiene, etc. Radicals included by R' are aryl radicals and halogenated aryl radicals such as phenyl, chlorophenyl, xylyl, tolyl, etc.; aralkyl radicals such as phenylethyl, benzyl, etc.; aliphatic, haloaliphatic and cycloaliphatic such as alkyl, alkenyl, cycloalkyl, haloalkyl including methyl, ethyl, propyl, butyl, chlorobutyl, cyclohexyl, etc.; cyanoethyl, cyanopropyl, cyanobutyl, etc.; fluoroethyl, fluoropropyl, etc.; and halogen radicals such as chloro, bromo, iodo, etc. Monovalent electron donating organic radicals included by Q or Formula 2 are aryl radicals, and hydroxyaryl, for example, phenyl, tolyl, hydroxyphenyl, etc.; aliphatic radicals including alkyl radicals such as methyl, ethyl, propyl, butyl, octyl, etc.; alkenyl radicals such as vinyl, propenyl, etc.; cycloaliphatic such as cyclohexyl, cycloheptyl, etc.; carboxyaliphatic radicals such as carboxymethyl, carboxyethyl, etc.; triorganosilyl radicals such as trimethylsilyl, dimethylphenylsilyl, etc.; nitroaliphatic radicals such as nitromethyl, nitroethyl, etc. Monovalent electron withdrawing organic radicals included by Q of Formula 2 are radicals such as aliphatic acyl, for example, formyl, acetyl, propionyl; arylacyl such as benzoyl, etc.; carboxy; aldehydic; sulfo; carboxyaryl, such as carboxyphenyl, carboxytolyl, etc.; nitroaryl such as nitrophenyl; haloaryl such as chlorophenyl, bromotolyl, etc.; haloaliphatic such as chloromethyl, chloroethyl, etc. Radicals included by R' can be all the same radicals or any two or more of the aforementioned R' radicals. Radicals included by Q also can be all the same radicals or any two or more of the aforementioned Q radicals.

The transition metals included within the scope of the present invention are all metals between Group III to VIII of the Periodic Table capable of forming a π complex with cyclopentadiene. The transition metals that are operative in the present invention are for example, metals having atomic numbers 22 to 28, 40 to 46, and 72 to 78, such as titanium, vanadium, chromium, manganese, iron, cobalt, nickel, zirconium, columbium, molybdenum, technitium, ruthenium, rhodium, palladium, hafnium, tantalum, tungsten, rhenium, osmium, iridium, and platinum. Preferably, M in Formula 2 is iron, osmium, or ruthenium.

Included by Formula 1 are bis-(silylmetallocene) organic materials such as

1′1′-bis(beta-trimethylsilylpropionyl)terephthaloylferrocene,
1′,1′-bis(trimethylsilylpropionyl)terephthaloylruthenocene,
1′,1′-bis(trimethylsilylpropionyl(terephthaloylosmocene,
1′,1′-bies(trimethylsilyltrimethylene)terephthaloylferrocene,
1′,1′-bis(trimethylsilyltrimethylene)terephthaloylruthenocene,
1′,1-bis(trimehtylsilyltrimethylene(terephthaloylosmocene,
1′,1′-bis(dimethylchlorosilylpropionyl)adipylferrocene,
1′,1′-bis(dimethylchlorosilylpropionyl)adipylruthenocene,
1′,1′-bis(dimethylbromosilylpropionyl)adipylosmocene,
1′,1′-bis(dimethylvinylsilylpropionyl)adipylferrocene,
1′,1′-bis(dimethylvinylsilylpropionyl)adipylruthenocene,
1′,1′-bis(dimethylvinylsilylpropionyl)adipylosmocene,
1′-trimethylsilylpropionyl-1′-trimethylsilyltrimethylenesuccinylferrocene,
1′-trimethylsilylpropionyl-1′-methylsuccinylferocene,
1′-dimethylphenylsilylbutanoyl-1′-phenylsuccinylruthenocene,
1′-dimethylvinylsilylpentanoyl-1′-sulfosuccinylosmocene, etc.

The bis-(silylmetallocene) organic materials of Formula 1 can be made by reacting at a temperature between —25° C. to 100° C., a dibasic acid halide included by the formula, (3)
$$X\overset{O}{\overset{\|}{C}}A\overset{O}{\overset{\|}{C}}X$$

and a silylorganometallocene having the formula, (4) $(R'')_3Si—R'—Y[Q_4C_5]M[C_5Q_5]$ where A, R, R', Y, Q and M are as defined above, and X is a halogen radical.

Dibasic acid halides included by Formula 3 are terephthaloylchloride, phthaloylchloride, isophthaloylchloride, malonylchloride, adipylchloride, succinylchloride, glutarylchloride, sebacoylchloride, etc. Also operative in the present invention is oxalylchloride which can provide for the production of bis-(silylmetallocene) organic materials of Formula 1, free of an A radical. The silylorganometallocenes of Formula 4, are more particularly described in copending application Serial No. 283,525, filed May 27, 1963, and assigned to the same assignee as the present invention. These silylorganometallocenes are made by acylating a metallocene having the formula, (5) $[Q_5C_5]M[C_5Q_5]$ where M and Q are as previously defined with a silylcarboxylic acid halide having the formula, (6)
$$(R')_3SiR—\overset{R}{\overset{\|}{C}}X$$

where R, R' and X are as defined above. Preferably, the metallocene of Formula 5 is ferrocene, osmocene, or ruthenocene.

As taught in the aforesaid copending application, silylorganometallocenes of Formula 4 made by reacting a metallocene of Formula 5 and a silylorganocarboxylic acid halide of Formula 6, can be modified further in accordance with standard chemical procedures to convert the carbonyl group of the resulting ketone, included by Y of Formula 4 to other radicals such as carbinol, carbamino, carbazido, methylene, etc. Similarly the diketones produced by the acylation of the silylorganometallocenes of Formula 4, with the dibasic acid halides of Formula 3 can be modified also to produce the various derivatives thereof, as shown by Formula 1, where Y' also includes various carbonyl derivatives.

The bis-(silylmetallocene) organic materials of Formula 1 can be employed in a variety of applications such as U.V. absorbers, heat-age additives for organopolysiloxane compositions, antioxidants, antiknocking materials, complexing agents for metal ions, etc. In addition, such materials have been found to exhibit valuable low temperature lubricating properties. The bis-(silylmetallocene) organic materials of Formula 1, when in hydrolyzable form such as when having terminal halogen radicals, can be converted to polymers containing chemically combined siloxy and organometallocene linkages by conventional hydrolysis procedures. As shown in copending application Ser. No. 283,530, filed May 27, 1963, and assigned to the same assignee as the present invention, cleavage of Si—C bonds with sulphuric acid, also can be employed to convert certain of the bis-(silylmetallocene) organic materials of the invention to the readily hydrolyzable disulfato form. Hydrolyzable bis-(silylmetallocene) organic materials of Formula 1, can also be copolymerized with organohalosilanes having halogen and monovalent hydrocarbon radicals chemically bonded to silicon atoms. These polymers and copolymers can be utilized in a variety of applications such as insulating coating materials, elastomers, lubricating oils, etc.

In the practice of the invention, bis-(silylmetallocene) organic material can be made by acylating a silylorganometallocene of Formula 4, with a dibasic acid halide of Formula 3. There is employed at least two moles of silylorganometallocene per mole of dibasic acid halide. Alternatively, the metallocene of Formula 5 can be acylated with the disbasic acid halide, followed by acylating with at least two moles, per mole of the resulting bis-(metallocene) organic material of a silylcarboxylic acid halide of Formula 6.

The acylation of the metallocene, with either the silylcarboxylic acid halide or the dibasic acid, can be achieved in accordance with standard Friedel-Crafts procedures. A Friedel-Crafts catalyst for example, aluminum chloride, boron trifluoride, zinc chloride, stannic chloride, etc., can be complexed initially with either of the acylating acids and the resulting complex can be reacted with the metallocene. Alternatively, the Friedel-Crafts catalyst can be added to a mixture of the metallocene with either the silylorganometallocene or the dibasic acid. In instances where it is desired to acylate a metallocene with a silyl carboxylic acid halide having less than two carbon atoms between the silicon atom and the carbonyl radical, for example, silylpropionyl halide, experience has shown that the Friedel-Crafts catalyst must be added to a mixture of the metallocene and the silylcarboxylic acid halide. Generally, however, the acylation of the metallocene with the silylcarboxylic acid halide can be achieved by any standard Friedel-Crafts method.

The Friedel-Crafts acylation of the metallocene can be facilitated by the employment of an organic solvent. Suitable organic solvents are for example, methylene chloride, toluene, xylene, etc. Reaction times can vary widely depending upon such factors as the catalyst employed, temperature, nature of reactants, etc. Temperatures between —25° C. to 100° C. are operable, while a temperature between 0° C. to 50° C. is preferred. The termination of the reaction can usually be determined when by-product HCl is no longer evolved. The mixture then can be hydrolyzed and the product extracted with organic solvent by standard procedures. Final recovery can be achieved by standard separation procedures such as stripping, chromatography, etc.

In order that those skilled in the art will be better able to practice the invention, the following examples are given by way of illustration and not by way of limitation. All parts are by weight.

*Example 1*

There were added slowly with stirring, 2.74 parts of aluminum chloride to a mixture of 3 parts of beta-trimethylsilylpropionylferrocene, 0.93 part of terephthaloyl chloride, and 20 parts of methylene chloride. Stirring was continued for an additional 32 hours, after the addition was completed. When the evolution of hydrogen chloride had ceased, the mixture was hydrolyzed by adding it to 75 parts of cold water mixed with about 9 parts of concentrated hydrochloric acid. There were then added to the hydrolysis mixture, 60 parts of methylene chloride, and it was allowed to stand for several days. The mixture was then neutralized with a 5% potassium hydroxide solution, dried over alumina and then stripped. A deep red solid was recovered. The product was then taken up in an ether-methylene chloride solvent mixture and chromatographed on a neutral, 80-mesh alumina, n-hexane column. There was obtained a 22% yield of a bright red crystalline product having a melting point of 147° C. to 148° C. Its infra-red spectrum showed the presence of carbonyl, similar to benzoylferrocene, superimposed on the known bans of the starting beta-trimethylsilylpropionylferrocene. Based on method of preparation and its infrared spectrum, the product was 1′,1′-bis(beta-trimethylsilylpropionyl)terephthaloylferrocene of the formula,

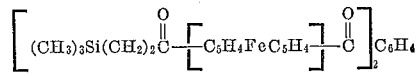

There is added to 100 parts of a polydimethylsiloxane gun having a viscosity of about 1 million centipoises at 25° C. while it is being milled on a rubber mill, 1 part of the product of Example 1. To the resulting mixture there also is added while milling, 40 parts of fume silica, and 1 part of benzoyl peroxide. The resulting mixture is formed into a sheet from which slabs are cut. A sheet is formed from a milled formulation following the same procedure, without the addition of the product of Example 1.

The slabs are then press-cured for 15 minutes at 150° C. and post-heated for 24 hours at 315° C. It is found that the slabs containing the product of Example 1 exhibit superior resistance to heat-age compared to the slabs free of the product of Example 1.

*Example 2*

There are added 3.0 parts of aluminum chloride to a solution of 4 parts of para-trimethylsilylbenzoylferrocene and 1.0 part of adipylchloride in 75 parts of methylene chloride, while it is stirred under a nitrogen atmosphere. A blue complex is formed and after the reaction proceeds for 24 hours at room temperature, the mixture is poured onto a mixture of 100 parts of ice containing 5 parts of hydrochloric acid. The reaction product is extracted with 75 parts of methylene chloride and the resulting organic layer is washed with a 5% potassium hydroxide solution. The organic layer is then dried and the solvent is stripped. A deep red oil is obtained which slowly tends to solidify. Its infrared spectrum shows the presence of carbonyl, characteristic of that produced from adipylchloride, superimposed on the bands of para-trimethylsilylbenzoylferrocene. Based on its method of preparation, and its infrared spectrum, the product is 1',1'-bis(p-trimethylsilylbenzoyl)adipylferrocene, having the formula,

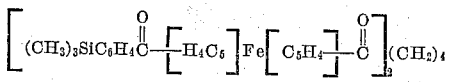

Example 3

There is rapidly added a solution of 26.2 parts of aluminum chloride in 150 parts of ether to a well stirred slurry of 3.8 parts of lithium aluminum hydride in 200 parts of dry ether. The mixture is allowed to stir at room temperature for about 30 minutes. There is added to the resulting mixture, a solution of 7.58 parts of 1',1'-bis(beta - trimethylsilylpropionyl)terephthaloylferrocene and 26.1 parts of aluminum chloride in 150 parts of ether over a period of about 1 hour. After the addition is completed, the reaction mixture is refluxed for an additional 3 hours. The mixture is then cooled and the excess lithium aluminum hydride and aluminum chloride is cautiously decomposed with ice water. The reaction mixture is acidified with HCl and the product extracted in ether. The ether is dried and stripped, leaving behind a red oil. The infrared spectrum of the red oil shows no presence of carbonyl groups. However, the characteristic spectrum of the starting 1',1'-bis(beta-trimethylsilylpropionyl)terephthaloylferrocene, free of carbonyl, remains unchanged. Based on its method of preparation and its infrared spectrum, the product is 1',1'-bis(gamma-trimethylsilylpropyl)p-xylyleneferrocene having the formula,

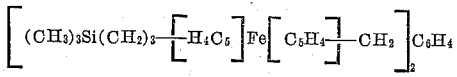

While the foregoing examples have of necessity been limited to only a few of the very many variables within the scope of the present invention, it should be understood that the present invention covers a much broader class of bis-(silylmetallocene) organic materials included by Formula 1, which can be made from metallocenes shown by Formula 5, and dibasic acid halides, and silyl acid halides in accordance with the practice of the invention.

What we claim as new and desire to secure by Letters Patent of the United States is:

1. Bis-(silylmetallocene) organic materials of the formula,

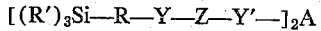

where R is a divalent radical having from 2 to 7 carbon atoms selected from the class consisting of alkylene radicals and arylene radicals, A is a member selected from the class consisting of R and methylene, R' is a member selected from the class consisting of monovalent hydrocarbon radicals, halogenated monovalent hydrocarbon radicals, cyanoalkyl radicals, fluoroalkyl radicals, and halogen radicals, Y and Y' are members selected from the class consisting of carbonyl, carbinol, carbamino, carbazido, and methylene, Z is a divalent radical of a metallocene selected from the class consisting of ferrocene, osmocene, and ruthenocene substituted with radicals selected from the class consisting of hydrogen, aryl radicals, alkyl radicals and mixtures thereof.

2. Terephthaloyl bis[1' - (para-trimethylsilylbenzoyl) ferrocene].

3. Adipyl bis[1' - (para - trimethylsilylbenzoyl)ferrocene].

4. p-Xylylene bis[1'-gamma-trimethylsilylpropyl ferrocene].

5. A method comprising (1) reacting a dibasic acid halide having the formula,

and a metallocene selected from the class consisting of ferrocene, osmocene and ruthenocene substituted with a silylorgano radical of the formula,

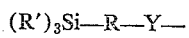

and radicals of the class consisting of hydrogen, aryl radicals, alkyl radicals, and mixtures thereof, in the presence of a Friedel-Crafts catalyst, and (2) recovering the resulting silylorganometallocene product of (1), where X is a halogen radical, R is a divalent radical having from 2 to 7 carbon atoms selected from the class consisting of arylene radicals and alkylene radicals, A is a member selected from the class consisting of R and methylene, R' is a member selected from the class consisting of monovalent hydrocarbon radicals, halogenated monovalent hydrocarbon radicals, cyanoalkyl radicals, fluoroalkyl radicals, and halogen radicals, and Y is a member selected from the class consisting of carbonyl, carbinol, carbamino, carbazido, and methylene.

No references cited.

TOBIAS E. LEVOW, *Primary Examiner.*

E. C. BARTLETT, J. G. LEVITT, P. F. SHAVER,
*Assistant Examiners.*